UNITED STATES PATENT OFFICE.

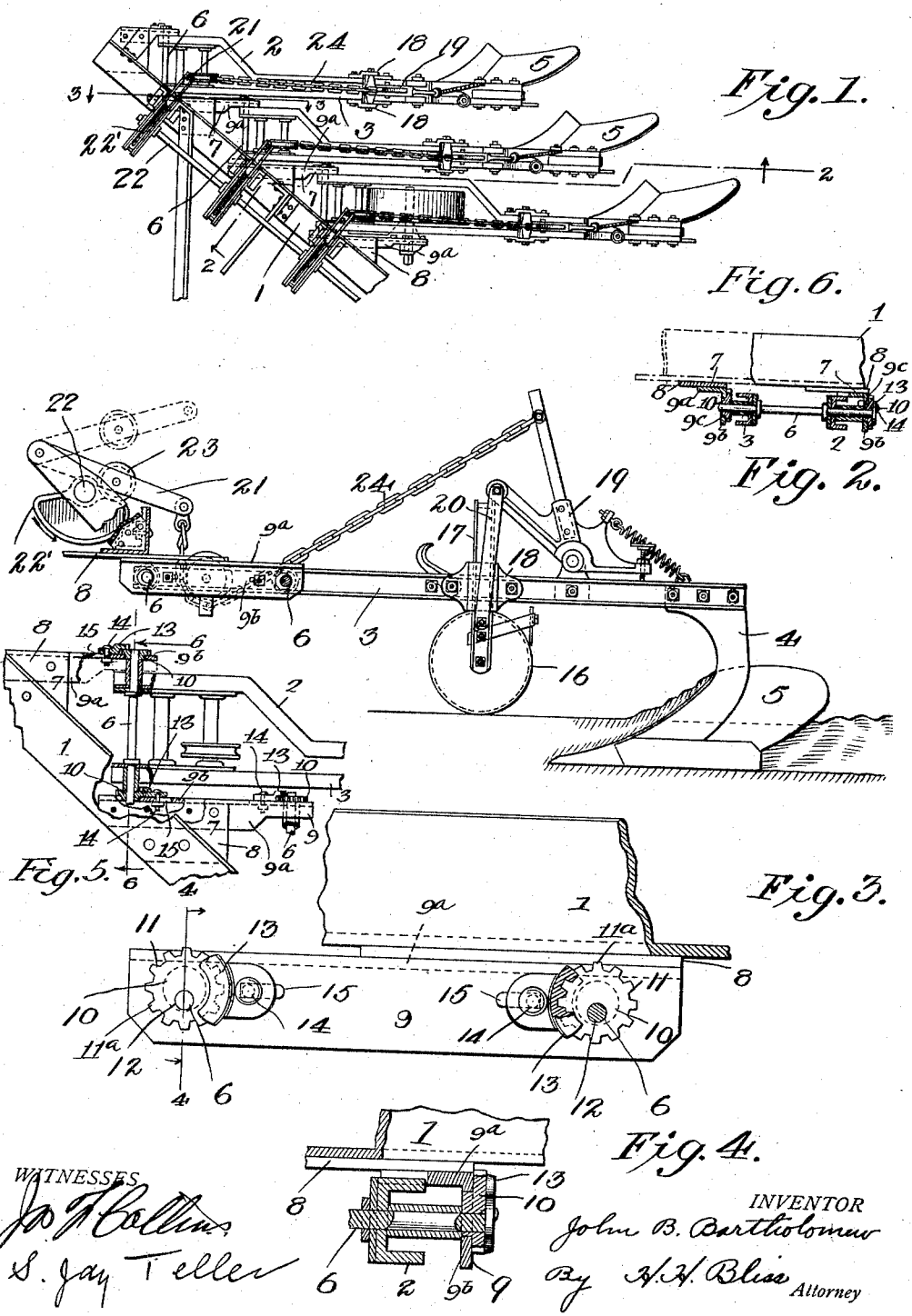

JOHN B. BARTHOLOMEW, OF PEORIA, ILLINOIS, ASSIGNOR TO AVERY COMPANY, OF PEORIA, ILLINOIS, A CORPORATION OF ILLINOIS.

GANG-PLOW.

1,303,232. Specification of Letters Patent. Patented May 13, 1919.

Original application filed January 18, 1912, Serial No. 671,955. Divided and this application filed July 2, 1912. Serial No. 707,256.

*To all whom it may concern:*

Be it known that I, JOHN B. BARTHOLOMEW, a citizen of the United States, residing at Peoria, in the county of Peoria and State of Illinois, have invented certain new and useful Improvements in Gang-Plows, of which the following is a specification, reference being had therein to the accompanying drawing.

This invention relates to improvements in gang plows of the type in which a series of individual plows are pivotally connected to a main plow frame and are supported from the ground on individual ground or gage wheels. The object of the invention is to provide improved means for supporting the plows at the points of pivotal connections with the main frame and improved means for adjusting the plows to level them and to equalize the distances between furrows.

This invention constitutes a division of my copending application for gang plows, Serial No. 671,955, filed January 18, 1912.

In the accompanying drawings:

Figure 1 is a plan view showing a part of a gang plow embodying my invention.

Fig. 2 is a combined sectional and elevational view taken along the line 2—2 of Fig. 1.

Fig. 3 is a fragmentary, elevational and sectional view taken along the line 3—3 of Fig. 1.

Fig. 4 is a fragmentary sectional view taken along the line 4—4 of Fig. 3.

Fig. 5 is a vertical transverse section on the line 5—5 of Fig. 1, showing the parts for pivotally connecting and adjusting both of the arms of a plow unit beam at their front ends.

Fig. 6 is a plan view of the same parts.

The main frame or truck frame of the plow may be constructed in any desired manner, but preferably has an oblique bar 1 at its rear end.

Each of the individual plows has a beam consisting of two parallel bars, 2 and 3. The standard 4 of the plow body 5 is bolted to the rear ends of the plow beam and the front ends of the said bars are spread apart to provide for a wide pivotal connection with the main frame. This connection is effected by means of a pivot pin 6 carried by brackets or arms 7—7, which extend rearward from the main frame. Each bracket has a plate 8 for securing it to the truck frame and an element 9, the latter having an upper plate part $9^a$, for securing it to the plate 8, and a vertically disposed box part $9^b$ having one or more seat bearings at $9^c$ to receive and support the rotary parts, connected to the plow, to be described. This box part $9^b$ is secured to the truck frame bracket by means of the plate part $9^a$, they being preferably formed together from angle iron, as shown. They are so arranged that the box or bearing at the right hand side of each plow coupling will be disposed oppositely to that on the left hand side.

In the box seats or bearings $9^c$ are mounted eccentrics or bearing blocks 10 carrying the plow. Each of these is provided with or connected to manually operable means for applying leverage to it to effect its rotary movement to adjust the plow. As shown each has a device at 11 for this purpose in the form of a flange provided with lever-like manually engageable projections $11^a$. The latter are relatively short to avoid the presence of long projections, and if they are found to be too short to permit the easy turning of the eccentrics by the direct engagement of the plowman's hand, the projections can be engaged by a lever extension in the form of a spanner bar, or equivalent, for applying power to rotate the eccentric. In each eccentric or bearing block 10 there is an aperture 12 adapted to receive the end part of the pivot pin 6, the fit of the latter being snug and yet such as to permit the various required adjustments.

It is necessary to have also means for securely locking the eccentrics after adjustment, and the projections $11^a$ can be so arranged that, in conjunction with a suitable fastening device, they will, in addition to serving for the application of leverage, also serve as one element of a fastener. The other element is a detent, in the form of a movable clip 13, having one or more projections or teeth adapted to engage with one or more of the projections or teeth on the part 11. This detent element is movable toward and from its locking position, and when in the latter, it is fastened by a bolt 14 movable along the bracket in the slot 15. The bearing aperture 12 can be adjusted forward or backward or up or down by disengaging the locking clip 13 and turning the eccentric.

The parts 9ᵇ, for each of the beam brackets which is intermediate of the first and last of the series, has two of the bearings or box seats 9ᶜ, the rear one receiving the right hand eccentric for one of the plow beams and the front one receiving the eccentric of the beam next to the right. The extreme beams of the series only require shorter supports 9ᵇ.

It will be seen that the bearing aperture 12 can be adjusted forward or backward or up or down by disengaging the locking clip 13 and turning the bearing block.

By referring to Fig. 1 it will be seen that the pivot pin 6 of each plow is supported at its right end in the rear bearing of one bracket and at its left end in the front bearing of the next adjacent bracket.

With the pivot pins mounted in the manner which has been described it will be understood that by rotating both bearing blocks through equal angles the pin can be moved vertically or horizontally or both. By turning one block and not the other or by turning the blocks in opposite directions the plow can be turned about a longitudinal axis for leveling or can be swung to the right or to the left to adjust the distances between it and the next adjacent plows.

16 represents one of the ground wheels upon which the plow beams are supported. The wheel is mounted at the lower ends of an inverted U-shaped standard 17 which is slidably connected to the beam bars 2 and 3 by means of plates 18—18. 19 is a lever pivotally mounted on the beam and this lever is connected with the standard 17 by means of links 20.

21 represents one of a series of levers mounted on the main frame. 22 is a rotatable shaft on the main frame, this shaft carrying a series of cams 22' of which one is shown in Fig. 2. This cam is constructed to engage with a roller 23 secured to the lever 21 and when the cam is rotated the lever is pushed upward. The upward movement of the lever is transmitted by means of the chain 24 to the lever 19 and the latter lever is swung forward. The forward movement of the lever 19 reacts upon the ground wheel 16 through the links 20 and causes the beam and the plow to be raised with respect to the ground wheel. When it is desired to lower the plow from its upper position to its lower position the cam 22 is again rotated and the roller 23 is released and the plow permitted to drop.

While I prefer a power actuated lifting mechanism such as that I have briefly described, I nevertheless desire it to be understood that my invention is not necessarily limited to use with such a power lifting mechanism and may, if desired, be used with plows adapted to be raised by manually controllable levers.

What I claim is:

1. In a gang plow, the combination of a main frame, a series of individual plows, and means for pivotally connecting the plows to the frame comprising bracket arms each having a bearing in its front end and a bearing in its rear end and one of said bearings being adjustable forward and backward, said arms being arranged in an obliquely extending series with the front bearing of one bracket opposite the rear bearing of the next adjacent bracket, and means for pivotally connecting the individual plow beams to said opposite bearings, substantially as set forth.

2. In a gang plow, the combination of a main frame, a series of individual plows each having two horizontal beam bars, an obliquely arranged series of longitudinally extending brackets connected at their forward ends to the main frame, each bracket being between the adjacent beam bars of adjacent plows, a series of transverse pivot pins, one for each plow, each pin being mounted at one end in the rear part of one of the brackets and at the other end in the front part of the next adjacent bracket, the mounting at one end of each pin being adjustable to permit the pin to be moved backward or forward and the plow to be correspondingly swung to one side or the other, and means for locking the pins in adjusted positions, substantially as set forth.

3. In a gang plow, the combination of a main frame, a series of plows, and means for connecting each plow to the main frame comprising a transverse and approximately horizontal pivot pin, a rotatably adjustable circular bearing block having an eccentrically arranged aperture for the pin, and means for securing the bearing block in adjusted position.

4. In a gang plow, the combination of a main frame, a series of plows, and means for coupling each plow to the frame comprising an elongated pivot pin, a pair of rotatably adjustable circular bearing blocks having eccentrically arranged apertures to receive the ends of the pin, and means for holding the bearing blocks in adjusted positions.

5. In a gang plow, the combination of a main frame, an obliquely arranged series of plows, and means for coupling the plows to the main frame comprising a series of bracket arms carried by the main frame, two rotatably adjustable circular bearing blocks mounted on each bracket arm one in front of the other, and each having an eccentrically arranged aperture, the rear bearing block of each bracket arm being transversely opposite the front bearing block of an adjacent bracket arm, means for holding the bearing blocks in adjusted position, and pivot pins mounted in the transversely opposite bearings of the bracket arms.

6. In a gang plow, the combination of a main frame, a series of individual plows, and means for coupling each plow to the frame comprising an elongated pivot pin and means for adjusting one end of the pin independently of the other end vertically and horizontally with respect to the main frame to level the plow or swing it laterally.

7. In a gang plow, the combination of a main frame, a series of individual plows, and means for coupling each plow to the main frame comprising an elongated pivot pin, means for adjusting one end of the pivot pin vertically and horizontally with respect to the frame, and means independent of the first said adjusting means for adjusting the other end of the pin vertically and horizontally with respect to the frame, the two said adjusting means making it possible to level the plow or to swing it laterally.

8. The combination with a truck frame, a truck frame bracket, and a plow, of boxes on the truck frame bracket, eccentrics carried by the plow and mounted in said boxes, and manually operable means connected with each of said eccentrics for operating the same to adjust the plow.

9. The combination with a truck frame and a plow, of boxes disposed opposite to each other and carried by the truck frame, eccentrics carried by the plow and mounted to turn in said boxes and manually operable means for operating said eccentrics.

10. In a gang plow, the combination with a truck frame, truck frame brackets and plow units, of boxes secured to each truck frame bracket, eccentrics carried by each plow unit and mounted in said boxes and means for operating said eccentrics to adjust the plow unit.

11. In a gang plow, the combination with a truck frame and a plow, of two eccentric structures connecting the plow with the truck frame and constituting pivotal connections for said plow, and means for independently operating said eccentric structures to effect lateral and leveling adjustments of the plow.

In testimony whereof, I affix my signature, in presence of two witnesses.

JOHN B. BARTHOLOMEW.

Witnesses:
J. M. CALDWELL,
A. L. GREGORY.

Copies of this patent may be obtained for five cents each, by addressing the "Commissioner of Patents, Washington, D. C."